US009427705B1

(12) United States Patent
 Abusharkh

(10) Patent No.: US 9,427,705 B1
(45) Date of Patent: *Aug. 30, 2016

(54) METHOD OF SOLVENT RECOVERY FROM A DILUTE SOLUTION

(71) Applicant: Basel Abusharkh, Al-Khobar (SA)

(72) Inventor: Basel Abusharkh, Al-Khobar (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,872

(22) Filed: Nov. 4, 2015

Related U.S. Application Data

(63) Continuation-in-part of application No. 14/720,666, filed on May 22, 2015.

(51) Int. Cl.
 *C02F 1/44* (2006.01)
 *B01D 61/02* (2006.01)
 *B01D 61/10* (2006.01)
 *C02F 1/469* (2006.01)

(52) U.S. Cl.
 CPC .............. *B01D 61/022* (2013.01); *B01D 61/10* (2013.01); *C02F 1/441* (2013.01); *C02F 1/442* (2013.01); *C02F 1/4693* (2013.01)

(58) Field of Classification Search
 None
 See application file for complete search history.

(56) References Cited

U.S. PATENT DOCUMENTS

| | | | |
|---|---|---|---|
| 3,350,292 A * | 10/1967 | Weinberger | B01J 39/00 203/33 |
| 4,312,755 A * | 1/1982 | Hwang | B01D 61/022 210/321.87 |
| 5,091,093 A | 2/1992 | Herwig et al. | |
| 6,113,797 A | 9/2000 | Al-Samadi | |
| 6,929,748 B2 | 8/2005 | Avijit et al. | |
| 7,811,457 B2 | 10/2010 | Marston | |
| 9,044,711 B2 | 6/2015 | McGinnis | |
| 2006/0011544 A1 | 1/2006 | Sharma et al. | |
| 2010/0192575 A1 | 8/2010 | Al-Mayahi et al. | |
| 2012/0160753 A1 | 6/2012 | Vora et al. | |
| 2012/0273417 A1 | 11/2012 | McGinnis et al. | |
| 2013/0334134 A1 | 12/2013 | Mierzejewski et al. | |
| 2014/0021135 A1 | 1/2014 | Sawyer et al. | |
| 2014/0045248 A1 | 2/2014 | Wallace | |
| 2014/0061129 A1 | 3/2014 | Hoz | |
| 2014/0224716 A1 | 8/2014 | Hancock et al. | |
| 2014/0299529 A1 | 10/2014 | Govind et al. | |
| 2015/0014248 A1 | 1/2015 | Herron et al. | |
| 2015/0136699 A1 | 5/2015 | Wohlert | |

FOREIGN PATENT DOCUMENTS

| | | | |
|---|---|---|---|
| EP | 0070059 A1 * | 8/1982 | |
| EP | 1020407 | 7/2000 | |

* cited by examiner

*Primary Examiner* — Krishnan S Menon
(74) *Attorney, Agent, or Firm* — Richard C. Litman

(57) ABSTRACT

The method of solvent recovery includes using a plurality of solvent recovery units to recover solvent from a dilute solution. The solvent recovery units can include a plurality of reverse osmosis or forward osmosis membrane systems arranged in series. For reverse osmosis, at least some of the concentrate in a last reverse osmosis unit of the series is recycled back to the permeate of that unit to provide a mixed permeate. The mixed permeate is then passed successively to the permeate side of each preceding reverse osmosis unit in the series. For forward osmosis, a draw solution is passed sequentially from the permeate side of each unit to the permeate side of the preceding unit. The draw solution may be prepared by concentrating part of the concentrate stream by evaporation and recycling it back as a draw solution.

5 Claims, 11 Drawing Sheets

METHOD OF SOLVENT RECOVERY FROM A DILUTE SOLUTION

REFERENCE TO RELATED APPLICATION

This application is a continuation-in-part of U.S. patent application Ser. No. 14/720,666 filed on May 22, 2015.

BACKGROUND OF THE INVENTION

1. Field of the Invention

The present invention relates generally to liquid processing systems and methods, and particularly to a method of solvent recovery from a dilute solution.

2. Description of the Related Art

Many solutions that exist in nature or that are produced by industrial processes or as waste streams are dilute. Sea water, for example, includes 3%-5% salts and 95%-97% water, while brackish water contains much more water and less dissolved solids. Conventional desalination of sea or brackish water is an energy intensive process that has a low recovery ratio and produces large amounts of effluents that have a negative impact on the environment. Milk includes 87%-91% water, and fruit and vegetable juices usually include 80%-95% water. The conventional process for concentrating milk, coffee extract, and juices to a high concentration utilize membrane processes having low recovery ratios or do not concentrate the streams to a high solute concentration.

One of the most common technologies used in solvent purification and concentrating dilute solutions is that of reverse osmosis (RO), where a solvent is forced through a permeable membrane from a region of high solute concentration to a region of low solute concentration by applying a pressure greater than osmotic pressure. However, conventional reverse osmosis (RO) processes suffer from certain challenges that include low recovery ratio and membrane scaling. These two challenges control the economics of RO desalination and concentrating dilute solutions and both of them are related to pressure across the membrane. Higher recoveries can be obtained by increasing the pressure across the membrane. However, such increase in pressure causes (1) higher scale formation that is promoted by compaction and (2) higher solute concentration in the concentrate side of the membrane. In addition, increased pressure across the membranes requires costly membrane assemblies and higher power consumption.

A number of liquid purification systems have been developed in the past. An example of such is found in European Patent Publication No. 1,020,407 published on Jul. 19, 2000 to Uwatech GMBH et al. This reference describes (according to the drawings and English abstract) treating condensate effluent containing ammonium nitrate by successive reverse osmosis to yield a process water stream and a concentrate which is recycled.

Thus, a method of solvent recovery from a dilute solution solving the aforementioned problems is desired.

SUMMARY OF THE INVENTION

The method of solvent recovery from a dilute solution, according to one embodiment, includes a first phase solvent recovery and a final phase solvent recovery. The first phase solvent recovery includes providing a dilute solution to a plurality of first phase reverse osmosis units. The final phase solvent recovery includes providing the processed solution from the first phase reverse osmosis units to a final phase reverse osmosis unit.

The first phase reverse osmosis units are arranged in series with one another from a first reverse osmosis unit to a last reverse osmosis unit. Each of the first phase reverse osmosis units has a concentrate side, a permeate side, and a reverse osmosis membrane separating the concentrate side from the permeate side. The first phase reverse osmosis units maintain a small differential of concentration of ions across the membrane by using low rejection membranes and/or passing brine from the concentrate side to the permeate side to form a mixed permeate. This small differential in ion concentration reduces the pressure gradient across the membrane. The mixed permeate from the first reverse osmosis unit is fed to the final phase reverse osmosis unit. The final phase reverse osmosis unit includes a high rejection membrane and produces pure solvent.

Another embodiment may include a forward osmosis process wherein a draw solution is passed sequentially from the permeate side of each unit in a series of forward osmosis units to the permeate side of the preceding unit in the series. Other embodiments include the introduction of a feed solution to the concentrate stream between two intermediate reverse osmosis units, or between the first stage and the final stage of a two stage reverse osmosis system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method of solvent recovery from a dilute solution includes several embodiments, each incorporating a plurality of solvent recovery units for recovery of solvent from a dilute solution. A dilute solution can include any solute-containing solvent of any concentration. For example, a "dilute solution" as used herein, can refer to milk, fruit juice, vegetable, juice, a saline liquid, or coffee. As used herein, "saline liquid" refers to a liquid that contains a significant concentration of dissolved salts (e.g., NaCl), such as sea water, brackish water, industrial waste water, municipal waste water, leachate water, frac water, or oil field production water. The method for solvent recovery can be used to desalinate a saline liquid. The solvent can be water, for example. The solvent recovery units can include reverse osmosis (RO), forward osmosis (FO), or nanofiltration (NF) membrane systems. The method can include maintaining a small differential in solute concentration across the membrane of each unit to thereby reduce the pressure gradient across the membrane. For one or more embodiments, a reduced pressure gradient can be maintained by using low rejection membranes and/or mixing the brine from the concentrate side with the permeate side.

According to one embodiment, several reverse osmosis (RO) membrane systems can be arranged in series in which part of the concentrate from the last stage is recycled back to the permeate side of the last stage membrane to increase its solute concentration to a level below the concentration of solute on the concentrate side. The difference in concentration between the two sides of the membrane can be controlled by controlling the recycle ratio from the last stage. Higher recycle ratios will result in lower pressure difference across the membrane. The recycle ratio can be defined as:

$$\text{Recycle Ratio} = \frac{\text{mass flow rate of the recycle stream to the permeate side of } n^{th} \text{ stage}}{\text{mass flow rate of the concentrate stream of } n^{th} \text{ stage}}$$

Figure 1:
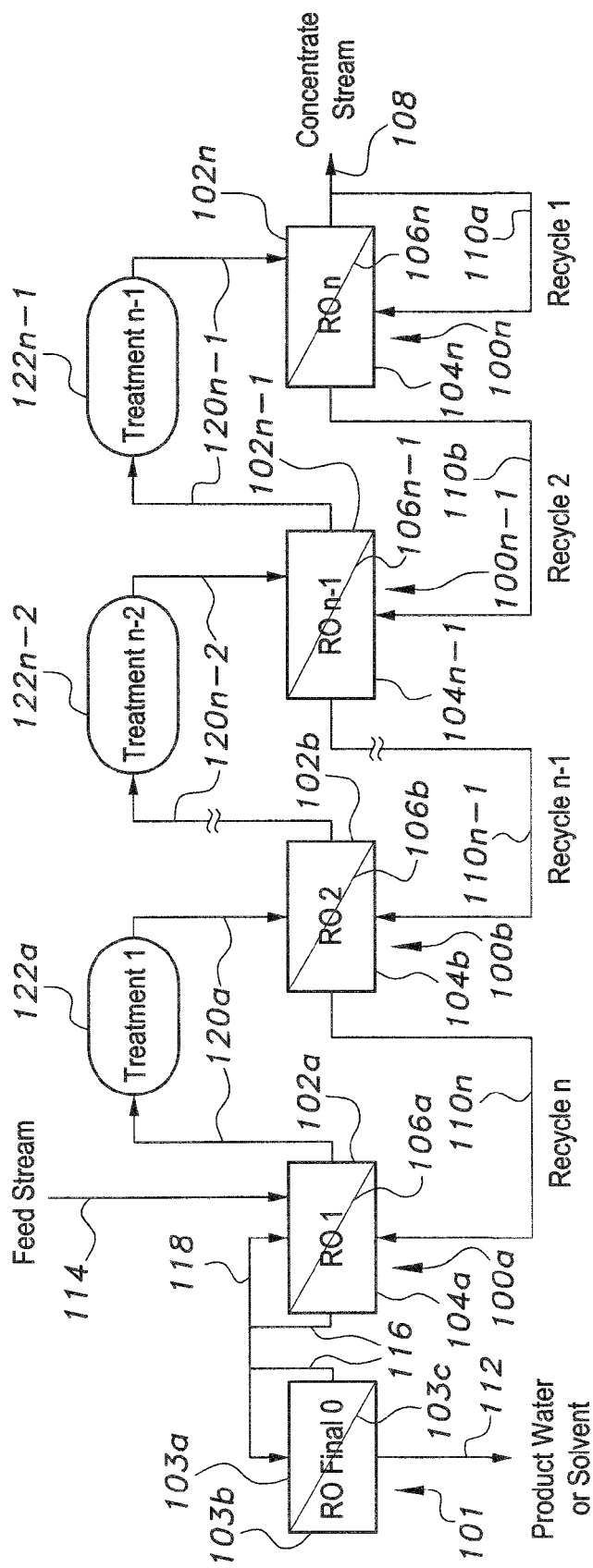
FIG. 1 is a schematic illustration of a first embodiment of a system and method of solvent recovery from a dilute solution according to the present invention.

The solute containing permeate of the last stage is fed to the permeate side of the stage before last resulting in a small concentration differential across the membrane before last and thus a low pressure differential. The combined permeate from the stage before last is fed to the permeate side of the previous stage as illustrated in FIG. 1 and discussed in detail below. This process is repeated until the feed stage is reached which receives the feed solution in the process. The permeate from the second stage is fed to the permeate side of the first stage to lower the pressure across the first stage. The permeate from the first stage is fed to the final stage which includes a conventional high rejection membrane that produces pure solvent. The concentrate from the final stage is fed to the feed side of the first stage and combined with the feed solution to the process.

FIG. 1 of the drawings is a schematic illustration of a first embodiment of the method of solvent recovery from a dilute solution. The first embodiment method includes performing a first phase solvent recovery and a final phase solvent recovery. The first phase solvent recovery is performed using a series of first phase reverse osmosis (RO) units designated as first reverse osmosis unit 100a, second reverse osmosis unit 100b, and a last reverse osmosis unit 100n. It will be seen that any practicable number of reverse osmosis units may be provided, as desired. The final phase solvent recovery is performed using at least one final phase reverse osmosis unit 101. Each first phase reverse osmosis unit 100a, 100b, 100n includes a concentrate side, respectively 102a through 102n, a permeate side, respectively 104a through 104n, and an RO membrane, respectively 106a through 106n, separating the concentrate and permeate sides of each reverse osmosis unit. The final phase reverse osmosis unit 101 includes a concentrate side 103a, a permeate side 103b, and an RO membrane 103c. The concentrate side 102a-102n of each of the first phase reverse osmosis units 100a-100n is in communicating relation with the concentrate side of the next reverse osmosis unit in succession. The permeate side 104a-104n of each of the first phase reverse osmosis units 100a-100n communicates with the permeate side of the preceding reverse osmosis unit in succession. The concentrate side 103a of the final phase reverse osmosis unit 101 is in communicating relation with the permeate side 104a of the first reverse osmosis unit 100a in the series of first phase reverse osmosis units.

The first phase solvent recovery includes successively receiving a feed stream of dilute solution such as a saline liquid in the concentrate side 102a-102n of the first phase reverse osmosis units 100a-100n. In each of the first phase reverse osmosis units 100a-100n, solvent is forced from the concentrate side into the permeate side by reverse osmosis. At least a portion of concentrate from the concentrate side 102n of the last reverse osmosis unit 100n is transferred into the permeate side 104n of the last reverse osmosis unit 100n to form a mixed permeate. The mixed permeate from the last reverse osmosis unit 100n is fed to the permeate side 104n-1 of the reverse osmosis unit 100n-1 immediately preceding the last reverse osmosis unit, and the mixed permeate from that reverse osmosis unit 100n-1 is passed to the preceding reverse osmosis unit 100b, and so forth until a mixed permeate is formed in each of the first phase reverse osmosis units. As the permeate in each first phase reverse osmosis unit is concentrated by the recycled concentrate from the next reverse osmosis unit, there is a smaller concentration differential between the permeate and the concentrate in each of the first phase reverse osmosis units. This allows the pressure differential, and thus the power required, to be reduced across each first phase reverse osmosis unit.

The final phase solvent recovery includes receiving from the first reverse osmosis unit 100a a feed stream of mixed permeate into the concentrate side 103a of the final phase reverse osmosis unit 101. As described above, the final phase reverse osmosis unit 101 includes a high rejection RO membrane 103c. Pure solvent is forced from the concentrate side 103a into the permeate side 103b of the final phase reverse osmosis unit 101, and released from the permeate side 103b to provide purified liquid. The concentrate from the final phase reverse osmosis unit 101 can be fed back to the concentrate side 102a of the first reverse osmosis unit 100a via line 118.

In more detail, the first reverse osmosis unit 100a receives a dilute solution, e.g., salt water, via a feed stream 114. Water is forced through the RO membrane 106a of the first reverse osmosis unit 100a to the permeate side, with the remaining concentrate passing to the concentrate side 102b of the next reverse osmosis unit 100b in series via a concentrate line 120a. Concentrate liquid from that reverse osmosis unit is passed to the next reverse osmosis unit in succession via a similar concentrate line. Concentrate sides 102a, 102b, . . . 102n of all of the reverse osmosis units 100a, 100b, 100n are connected in series with one another by respective concentrate lines 120a, 120b, . . . 120n−1. A liquid treatment device can be installed in series in each of the concentrate lines, with all of the concentrate liquid passing through each of the devices in succession. Thus, a first liquid treatment device 122a can be installed in the concentrate line 120a between the concentrate sides 102a and 102b of the first and second reverse osmosis units 100a and 100b, etc., with a penultimate liquid treatment device 122n−2 being installed in the concentrate line 120n−2 between the concentrate side of the preceding reverse osmosis unit and the concentrate side 102n−1 of the reverse osmosis unit 100n−1, and a last liquid treatment device 122n−1 installed in the concentrate line 120n−1 between the concentrate side 102n−1 of the penultimate reverse osmosis unit 100n−1 and the concentrate side 102n of the last reverse osmosis unit 100n. These liquid treatment devices 122a . . . 122n−1 provide further purification of the solvent or other liquid passing through the system by removing scale forming salts, ions, and/or other materials. The liquid treatment device can be a filtration device, a chemical seeding device, a chemical injection device, and/or a nanofiltration device, which may be followed by further filtration and/or ion exchange.

The concentrate is recycled from the output or concentrate stream 108 from the concentrate side 102n of the last reverse osmosis unit 100n, back to the permeate side 104n of that reverse osmosis unit by a first recycle line 110a to form a mixed permeate, thus increasing the concentrate level in the permeate side 104n of that reverse osmosis unit. The permeate side 104n of the last reverse osmosis unit 100n is connected to the permeate side 104n−1 of the immediately preceding reverse osmosis unit 100n−1 by a second recycle line 110b. The mixed permeate is passed to the permeate side 104n−1 of the preceding reverse osmosis unit 100n−1 from the permeate side 104n of the last reverse osmosis unit 100n in the reverse osmosis unit series. This recycling process continues, with a recycling line 110n−1 delivering mixed permeate to the permeate side 104b of the second reverse osmosis unit 100b and mixed permeate from the second reverse osmosis unit 100b passes to the permeate side 104a of the first reverse osmosis unit 100a. The mixed permeate from the first reverse osmosis unit is fed to the final phase reverse osmosis unit 101. Purified liquid in the permeate side 103b of the final phase reverse osmosis unit 101 is expelled therefrom by a product water or solvent line 112.

The process of recycling permeate from each successive reverse osmosis unit to the preceding reverse osmosis unit has the effect of increasing the concentrate level in the permeate side of each reverse osmosis unit, thus reducing the concentration differential across the RO membrane. Thus, less pressure, and less power, is required to force the concentrate through the RO membrane of each reverse osmosis unit. Further, the RO membranes of the first phase reverse osmosis units may be low rejection membranes or leaky membranes which will allow salt ions to leak through the membrane to reduce the concentration differential across the membrane. In other words, the RO membranes of the first phase reverse osmosis units may be somewhat more porous, i.e., more permeable, than would otherwise be required. The greater porosity and permeability also results in reduced cost.

Figure 2:
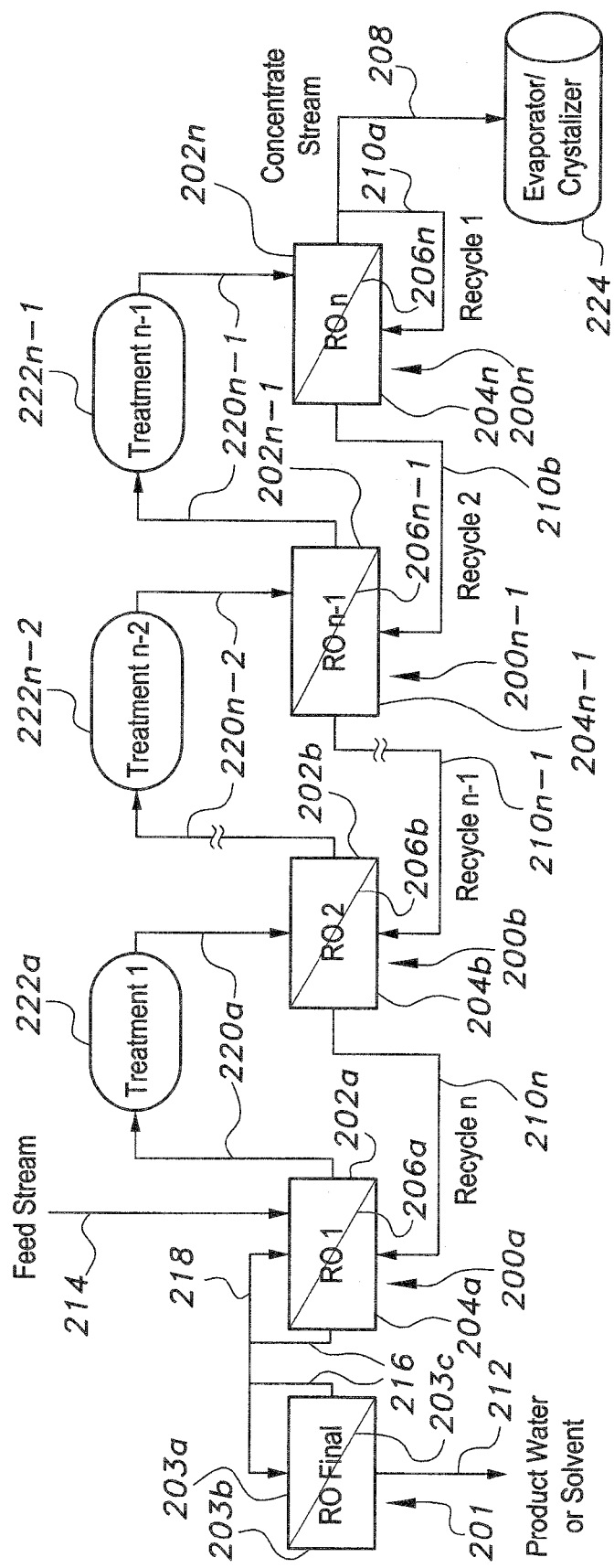
FIG. 2 is a schematic illustration of a second embodiment of a system and method of solvent recovery from a dilute solution according to the present invention, incorporating an evaporator and/or crystallizer.

FIG. 2 of the drawings provides a schematic illustration of a second embodiment of the method solvent recovery from a dilute solution. It will be seen that the components of the second embodiment of FIG. 2 are essentially identical to corresponding components of the first embodiment of FIG. 1, but the components of the FIG. 2 embodiment are designated by reference characters beginning with the number "2," rather than with a "1" as in the case of the embodiment of FIG. 1. The method of operation of the system illustrated in FIG. 2 is the same as described above for the operating method of the first embodiment of FIG. 1, with the exception of an additional evaporator and/or crystallizer device 224 installed at the output or discharge end of the concentrate or output stream or line 108. Any remaining solvent, e.g., water, etc., passes from the concentrate side 102n of the last reverse osmosis unit 100n through the concentrate output line 108 and is processed through this device 224, and solids are recovered (e.g., precipitated out of solution, recovered after liquid evaporation, etc.) for use or disposal as desired.

Figure 3:
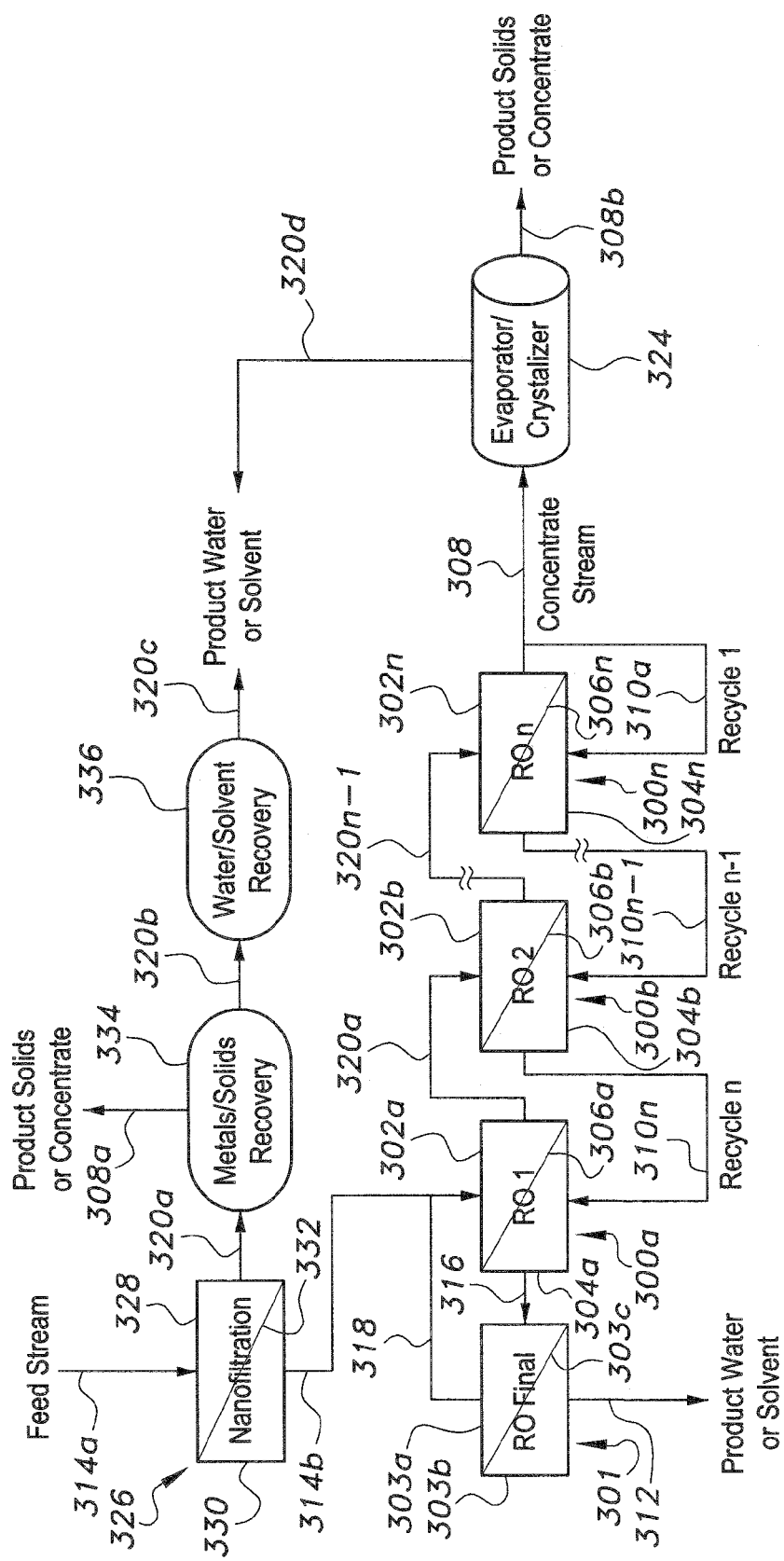
FIG. 3 is a schematic illustration of a third embodiment system of a system and method of solvent recovery from a dilute solution according to the present invention, incorporating a nanofiltration device in the incoming liquid feed stream.

FIG. 3 of the drawings provides a schematic illustration of a third embodiment of the method solvent recovery from a dilute solution. It will be seen that most of the components of the third embodiment of FIG. 3 are essentially identical to corresponding components of the first and second embodiments of FIGS. 1 and 2, but the components of the FIG. 3 embodiment are designated by reference characters beginning with the number "3," rather than with a "1" or a "2" as in the case of the embodiments of FIGS. 1 and 2. The method of operation of the system illustrated in FIG. 3 is generally the same as described above for the operating method of the embodiment of FIG. 2, with the exception of a parallel system between the feed stream 314 and the evaporator and/or crystallizer 324. In the system of FIG. 3, a nanofiltration device 326 is installed in series in the feed stream line upstream of the first reverse osmosis unit 304a. The nanofiltration device 326 includes a concentrate side 328 fed by the incoming feed stream line 314a, a permeate side 330 delivering permeate to an outgoing feed stream line 314b and thence to the concentrate side 302a of the first RO reverse osmosis unit 300a, and a reverse osmosis unit element 332 (e.g., nanoreverse osmosis unit, etc.) between the two sides 328 and 330. A connecting line 318 extends between the outgoing feed stream line 314b and the concentrate side 303a of the final phase reverse osmosis unit 301, to deliver treated liquid to the final phase reverse osmosis unit 301. The final phase reverse osmosis unit 301 also receives mixed permeate from the permeate side 304a of the first reverse osmosis unit 300a in the manner described above for the first embodiment of FIG. 1, also used in the second embodiment of FIG. 2.

The third embodiment of FIG. 3 further includes a metals and solids recovery device 334 that receives and processes concentrate from the concentrate side 328 of the nanofiltration device 326 via an interconnecting line 320a, with a water and/or solvent recovery device 336 receiving and processing liquid output from the metals and solids recovery device 334 via an interconnecting line 320b. Processed water or solvent is delivered from the system by a line 320c from the water and/or solvent recovery device 336, and by a line 320d from the evaporator/crystallizer device 324. Processed solids and/or concentrate are removed from the system by output 308a from the metals and solids recovery device 334, and by output 308b from the evaporator/crystallizer device 324. The two outputs 308a, 308b may extend to a single output destination, similarly to the two lines 320c and 320d that extend to a single product water or solvent collection point.

Figure 4:
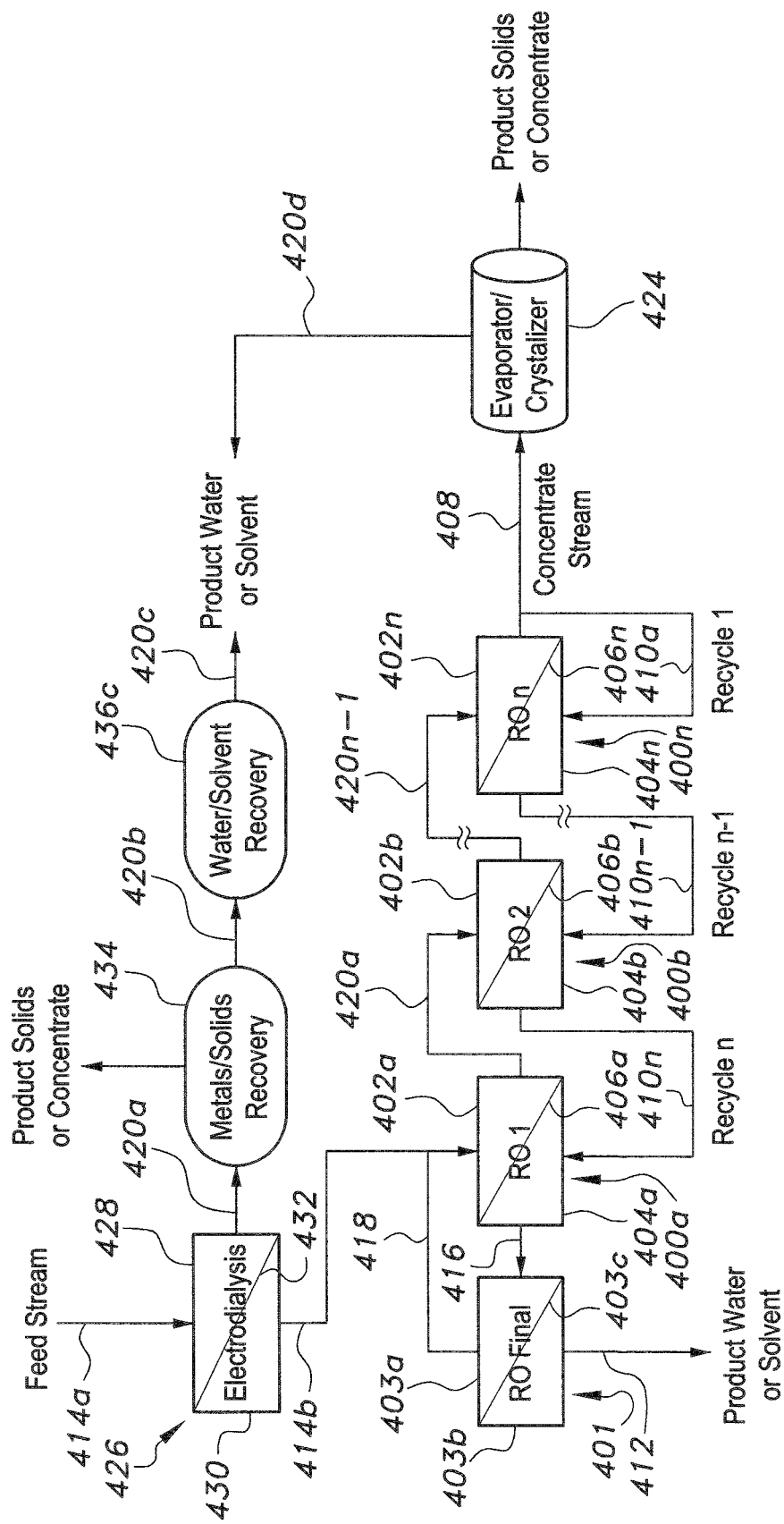
FIG. 4 is a schematic illustration of a fourth embodiment of a system and method of solvent recovery from a dilute solution according to the present invention, incorporating an electrodialysis device in the incoming liquid feed stream.

FIG. 4 of the drawings provides a schematic illustration of a fourth embodiment of the method of solvent recovery from a dilute solution. It will be seen that most of the components of the fourth embodiment of FIG. 4 are essentially identical to corresponding components of the third embodiment of FIG. 3, but the components of the FIG. 4 embodiment are designated by reference characters beginning with the number "4," rather than with a "3" as in the case of the embodiment of FIG. 3. The method of operation of the system illustrated in FIG. 4 is generally the same as described above for the operating method of the embodiment of FIG. 3, with the exception of the installation of an electrodialysis device 426 in place of the nanofiltration device 326 of the system of FIG. 3. The electrodialysis device 426 includes an input or concentrate side 428, an output or permeate side 430, and an electrodialysis unit or component 432 therebetween. Concentrate liquid is provided to the concentrate side 428 of the device and is processed therein by the electrodialysis unit 432, with the processed liquid passing from the output side 430 to the concentrate side 402a of the phase 1 RO unit 400a via the line 414b, and to the concentrate side 403a of the final reverse osmosis unit 401 via the line 418. The concentrate side 428 of the electrodialysis device 426 also provides concentrate to the metals and/or solids recovery device 434 via a line 420a, with the remainder of the system of FIG. 4 operating identically to the system of FIG. 3.

Figure 5:
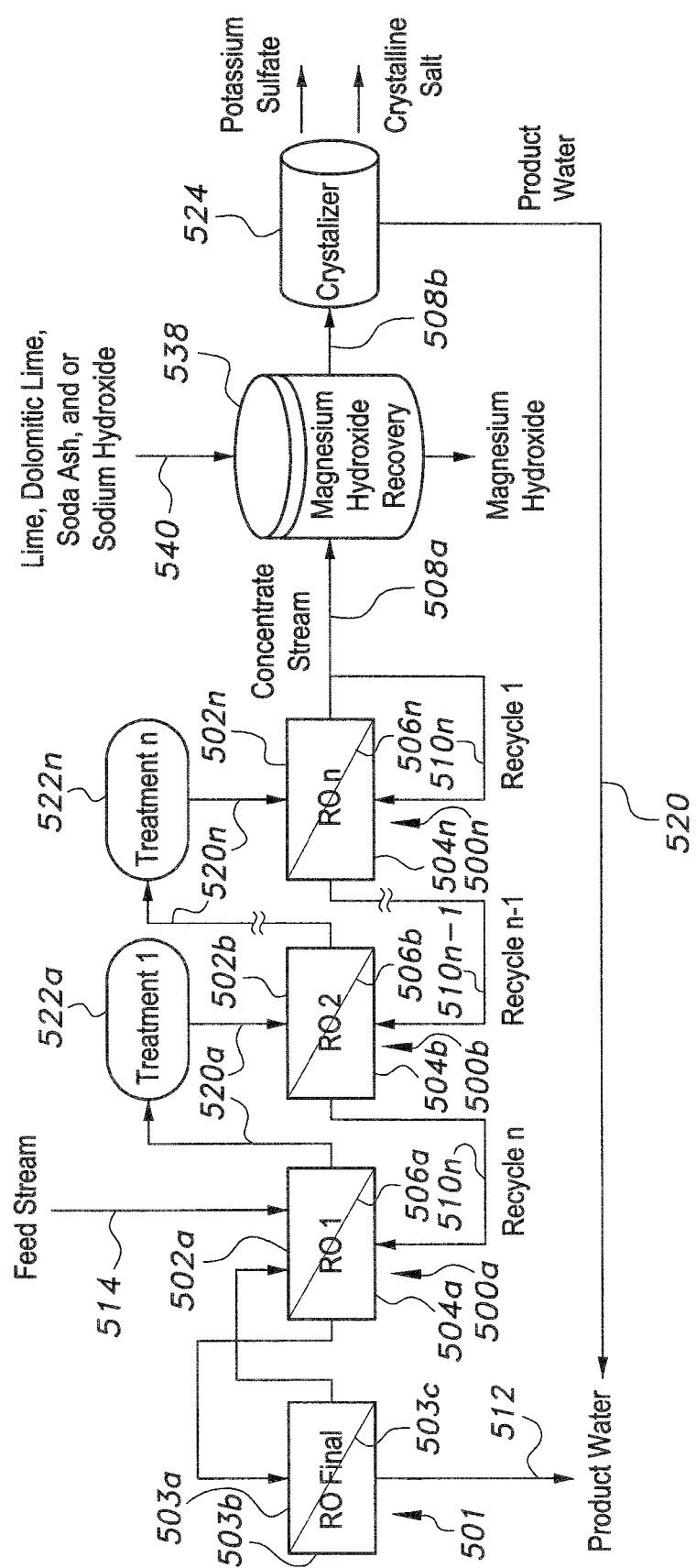
FIG. 5 is a schematic illustration of a fifth embodiment of a system and method of solvent recovery from a dilute solution according to the present invention, incorporating a magnesium hydroxide recovery device in the output liquid feed stream.

FIG. 5 of the drawings provides a schematic illustration of a fifth embodiment of the method of solvent recovery from a dilute solution. It will be seen that most of the components of the fifth embodiment of FIG. 5 are essentially identical to corresponding components of the second embodiment of FIG. 2, but the components of the FIG. 5 embodiment are designated by reference characters beginning with the number "5," rather than with a "2" as in the case of the embodiment of FIG. 2. The method of operation of the system illustrated in FIG. 5 is generally the same as described above for the operating method of the embodiment of FIG. 2, with the exception of a magnesium hydroxide (MgOH) recovery device 538 disposed between the concentrate side 502n of the last RO unit 500n and the crystallizer 524, which may be identical to the evaporator and/or crystallizer devices of the embodiments of FIGS. 2 through 4. A concentrate stream line 508a extends from the concentrate side 502n of the last phase RO unit 500a, to supply the MgOH recovery device 538. Output from the MgOH recovery device 538 is supplied to the evaporator and/or crystallizer (or crystallizer) 524 by a second concentrate line 508b. Additional concentrate in the form of lime and/or dolomitic lime, soda ash, and/or sodium hydroxide is fed to the MgOH recovery device by an additional feed line 540, with the MgOH recovery device processing the input material and delivering MgOH therefrom. Other concentrate is delivered to the crystallizer or evaporator and/or crystallizer 524 by a line or feed 508b for processing. The evaporator and/or crystallizer 524 delivers a solids output of potassium sulfate and crystalline salt, with liquid in the form of product solvent being output by a line 520. Product solvent is also delivered from the permeate side 503b of the final phase reverse osmosis unit 501 by a line 512. These two lines 512 and 520 may deliver their product water output to a common collection point, as indicated in FIG. 5.

The volume of product solvent produced by the present methods can be at least 70% of the volume of the feed solvent stream. For example, the volume of product solvent can be about 70% to about 95% of the volume of the feed stream. As an example of the efficiency of the above-described embodiments, a desalination plant reject stream was processed through a reverse osmosis system including a first phase liquid purification having three reverse osmosis units and a final phase liquid purification having one reverse osmosis unit, according to the present teachings, with ion exchange after the second first phase reverse osmosis unit. Table 1 below shows the concentrations of the three concentrate streams as well as the concentration of the permeate stream from the final phase liquid purification. A concentration of 26 percent can be achieved from the concentrate stream of the third RO unit.

TABLE 1

|  | PPM | MASS (KG) | RO 1 Concentrate | RO 2 Concentrate | RO 3 Concentrate | RO Final Permeate Final |
| --- | --- | --- | --- | --- | --- | --- |
| Chloride (Cl) | 36159 | 3.6159 | 3.579741 | 3.50814618 | 3.473064718 | 0.015 |
| Sodium (Na) | 16800 | 1.68 | 1.6632 | 1.629936 | 1.61363664 | 0.0075 |
| Bromide (Br) | 1 | 0.0001 | 0.000099 | 0.00009702 | $9.60498 \times 10^{-5}$ | $3.9502 \times 10^{-6}$ |
| Sulfate (SO4) | 550 | 0.055 | 0.054945 | 0.0274725 | 0.01373625 | 0.004126375 |
| Potassium (K) | 556 | 0.0556 | 0.0555444 | 0.0277722 | 0.0138861 | 0.002085695 |
| Calcium (Ca) | 864 | 0.0864 | 0.0863136 | 0.0431568 | 0.0215784 | 0.00324108 |
| Magnesium (Mg) | 2448 | 0.2448 | 0.2445552 | 0.1222776 | 0.0611388 | 0.00918306 |
| Water | 0.942622 | 94.2622 | 47.1311 | 28.27866 | 19.795062 | 74.467138 |
| TDS | 57378 | 5.7378 | 5.6843982 | 5.3588583 | 5.197136958 | 0.04114016 |
| MASS FRACTION OF SALTS |  | 0.06087064 | 0.120608223 | 0.189501847 | 0.262547142 | 0.000552461 |

It will be noted that the concentrate stream from the third RO unit as described in Table 1 above can be further processed to recover magnesium hydroxide by adding dolomitic lime. Further, the concentrate stream from the third RO unit as described in Table 1 above can be fed to a three-phase crystallizer as shown in the schematic illustrations of FIGS. 2 through 5 in which gypsum, magnesium hydroxide, and crystalline salt of up to 99.8 percent purity may be obtained, and water is recovered.

The various embodiments of the liquid purification method of the present invention are not limited to saline or brackish water. As another example of a liquid purification process conducted in accordance with one or more embodiments of the present invention, skim milk containing nine percent solids was concentrated to 38 percent by passing the liquid through a six stage RO system utilizing low pressure RO membrane assemblies. The skim milk was fed to the first stage at a concentration of nine percent solids and the concentration was increased to 15 percent solids in the first stage. In the second stage, the concentration increased to 21 percent, and in the third stage it was increased to 26 percent. The fourth, fifth, and sixth or last stage increased the solids concentration to 30 percent, 34 percent, and 38 percent, respectively. Part of the 38 percent final concentration was recycled to the permeate side. Permeate from the sixth stage was pumped to the fifth stage, maintaining a concentration difference of about five to seven percent between stages. The permeate stream of the first stage was fed to the feed side of the final ($0^{th}$) stage, where it was concentrated to nine percent and combined with the liquid feed to the first stage. Water recovered from the final or $0^{th}$ stage was treated for further recovery.

Another example of the reverse osmosis process is provided wherein the water extracted from a cheese manufacturing process contained up to five percent dissolved solids, with those solids containing a high percentage of proteins. This water was treated similarly to that of the example further above wherein skim milk was treated using the reverse osmosis process, in a seven stage system to increase the solids concentration to 40 percent and to recover the water for reuse in the cheese manufacturing process. The concentrated solution is further treated to recover protein solids by freeze drying or other drying methods.

Yet another example is the processing of waste water from pulp and paper manufacturing, using the RO process. The process waste water of a pulp and paper manufacturing plant contains about two percent TDS. The process waste water is filtered, then fed to a ten stage RO process similar to the one described in the example wherein the results are tabulated in Table I further above. The waste process water is concentrated to 25 percent solids. The desalinated water produced from the final or $0^{th}$ stage is recovered and recycled as process water in the pulp and paper process. The concentrated process waste water solution is treaded further by evaporation. In this example, 94 percent of the waste process water is recycled and reused in the pulp and paper process.

Figure 6:
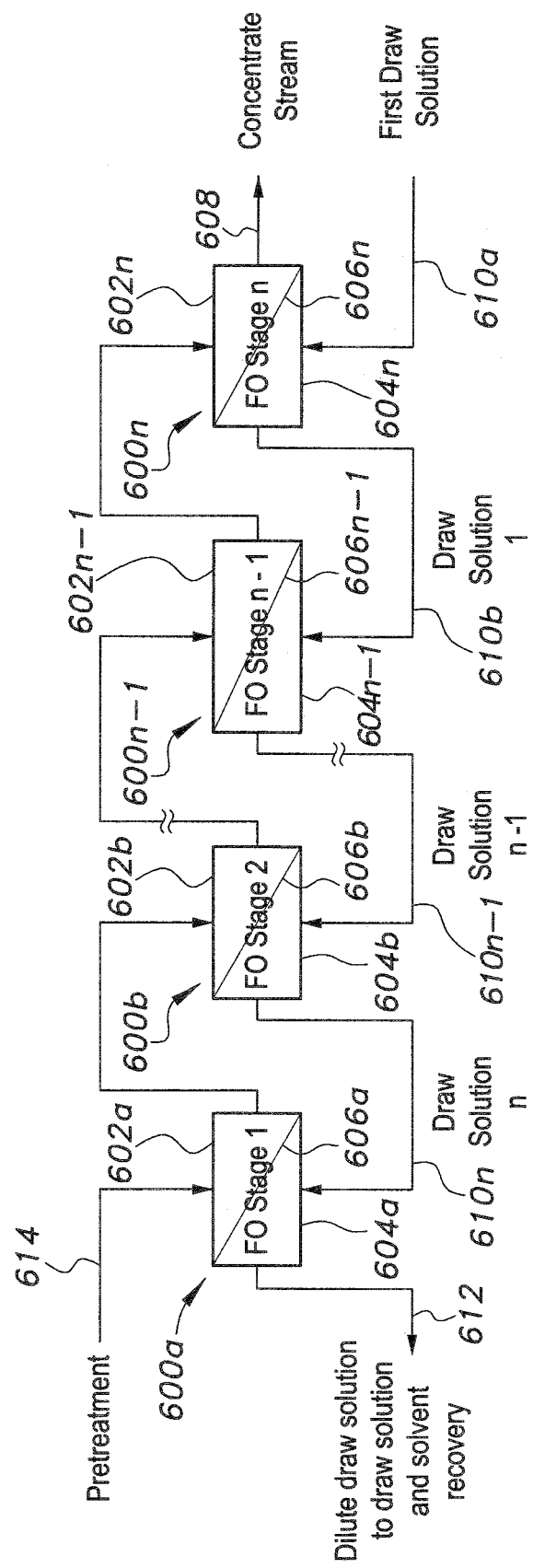
FIG. 6 is a schematic illustration of a sixth embodiment of a system and method of solvent recovery from a dilute solution according to the present invention, wherein forward osmosis is used in each stage.

FIG. 6 of the drawings provides a schematic illustration of a sixth embodiment of the method of solvent recovery. The embodiment of FIG. 6 differs from previous embodiments described further above and illustrated in FIGS. 1 through 5 primarily in that the stages 600a through 600n of the embodiment of FIG. 6 are forward osmosis devices, rather than reverse osmosis units. Each of the forward osmosis stages 600a through 600n includes a concentrate side, respectively 602a through 602n, a permeate side, respectively 604a through 604n, and a forward osmosis (FO) membrane, respectively 606a through 606n, separating the concentrate and permeate sides of each forward osmosis unit.

FO systems differ from RO systems in that in the case of forward osmosis, very little differential pressure is required to drive the solute across the membrane, e.g., 606a for the first unit 600a, from its concentrate side 602a to its permeate side 604a. Rather, the transfer of solute across the membrane is dependent upon natural differential osmotic pressure. This is enhanced by providing a "draw solution" to the permeate side of the unit, i.e., a solute containing material dissolved therein to reduce its osmotic pressure relative to the concentrate on the concentrate side of the osmotic membrane. The draw solution essentially draws the solvent from the concentrate side of the unit through the membrane, thus increasing the concentration on the concentrate side of the FO unit.

In the embodiment of FIG. 6, the concentrate side 602a-602n of each of the forward osmosis stages 600a-600n is in communicating relation with the concentrate side of the next forward osmosis stage in succession. The permeate side 604a-604n of each of the forward osmosis stages 600a-600n communicates with the permeate side of the preceding forward osmosis stage in succession. The solvent recovery includes successively receiving a feed stream of concentrate liquid in the concentrate side 602a-602n of the forward osmosis stages 600a-600n. In each of the forward osmosis units 600a-600n, water (or other liquid) passes from the concentrate side into the permeate side by forward osmosis. Initial supply of pretreated concentrate flows to the concentrate side 602a of the first stage FO unit 600a via a pretreatment supply line 614.

Rather than passing a portion of the concentrate stream from the concentrate side of the final osmosis stage back to the permeate side of that stage, as in the first embodiment of FIG. 1, the concentrate stream 608 of the forward osmosis embodiment of FIG. 6 is not remixed with any of the liquid concentrate or permeate of the system after being discharged from the concentrate side 602n of the final forward osmosis stage 600n. The forward osmosis system embodiment of FIG. 6 uses a draw solution of higher concentrate than the concentrate resulting in the concentrate side 602n of the final forward osmosis stage 600n. This draw solution enters the system through a first draw solution line 610a to the permeate side 604n of the final forward osmosis stage 600n. The draw solution is diluted by osmotic flow through the membrane 606n to the permeate side 604n of the final stage 600n. The diluted draw and permeate solution then flows from the permeate side 604n of the final stage 600n, to the permeate side 604n-1 of the preceding stage 600n-1, with this process continuing in sequence until the progressively diluted draw solution reaches the permeate side 604a of the first forward osmosis unit 600a, whereupon the dilute draw solution and permeate is discharged via the discharge line 612. Thus, the draw solution is progressively diluted at each stage and always remains more dilute than the progressively concentrated liquid in the concentrate side of each stage. The feed stream of solvent received in the concentrate side can include a solute different from a solute of the draw solution. The feed stream of solvent received in the concentrate side can include a solute concentration different from a solute concentration of the draw solution. It will also be seen that any of the additional processing steps and/or procedures described further above in the embodiments of FIGS. 1 through 5, i.e., liquid treatment devices, evaporation and/or crystallizer devices, nanofiltration, metals and/or other solids recovery, water and/or other solvent recovery, and magnesium hydroxide recovery, may be implemented with the forward osmosis process of FIG. 6, if desired.

In an example using the forward osmosis (FO) process of FIG. 6, a fresh orange juice stream was first pretreated by filtration to remove suspended solids. The filter cake was recovered for mixing with concentrated juice. The filtered juice was fed to the first stage of a multi-stage system using FO membranes, as described above. The permeate side of the membrane contained a concentrated sugar draw solution. The orange juice solids concentration was increased by five percent in the first FO stage, and was pumped to a second FO stage where its TDS concentration was increased by another four percent. The juice was concentrated through five stages to produce an orange juice concentrate. The concentrated sugar solution was fed to the fifth stage FO unit, with this unit removing a large percentage of the water from the orange juice by FO. The slightly diluted draw solution was pumped from the permeate side of the fifth stage to the fourth stage to remove more water from the juice. The draw solution was pumped from the fourth and then to the third, second, and first FO stages, maintaining a lower osmotic pressure of the draw solution than the juice stream in the FO stages. The dilute draw solution produced in the first stage can be reconcentrated using an RO process, a thermal evaporation process, or a combination of the two to recover the water and concentrate the draw solution for reuse in the process.

The forward osmosis process may also be used to process saline water and brine, and/or water containing other chemicals and/or ions. In an example of such, a natural brine containing three percent lithium salt was concentrated to a 20 percent solution to recover the lithium salt by evaporation. The lithium brine is fed to a ten stage FO process similar to the process used in the example cited above for the processing of orange juice. The draw solution fed to the tenth stage is a 25 percent by weight sodium chloride solution. The draw solution was re-concentrated in an evaporation pond. It was then filtered and reused as a draw solution in the process.

Figure 7:
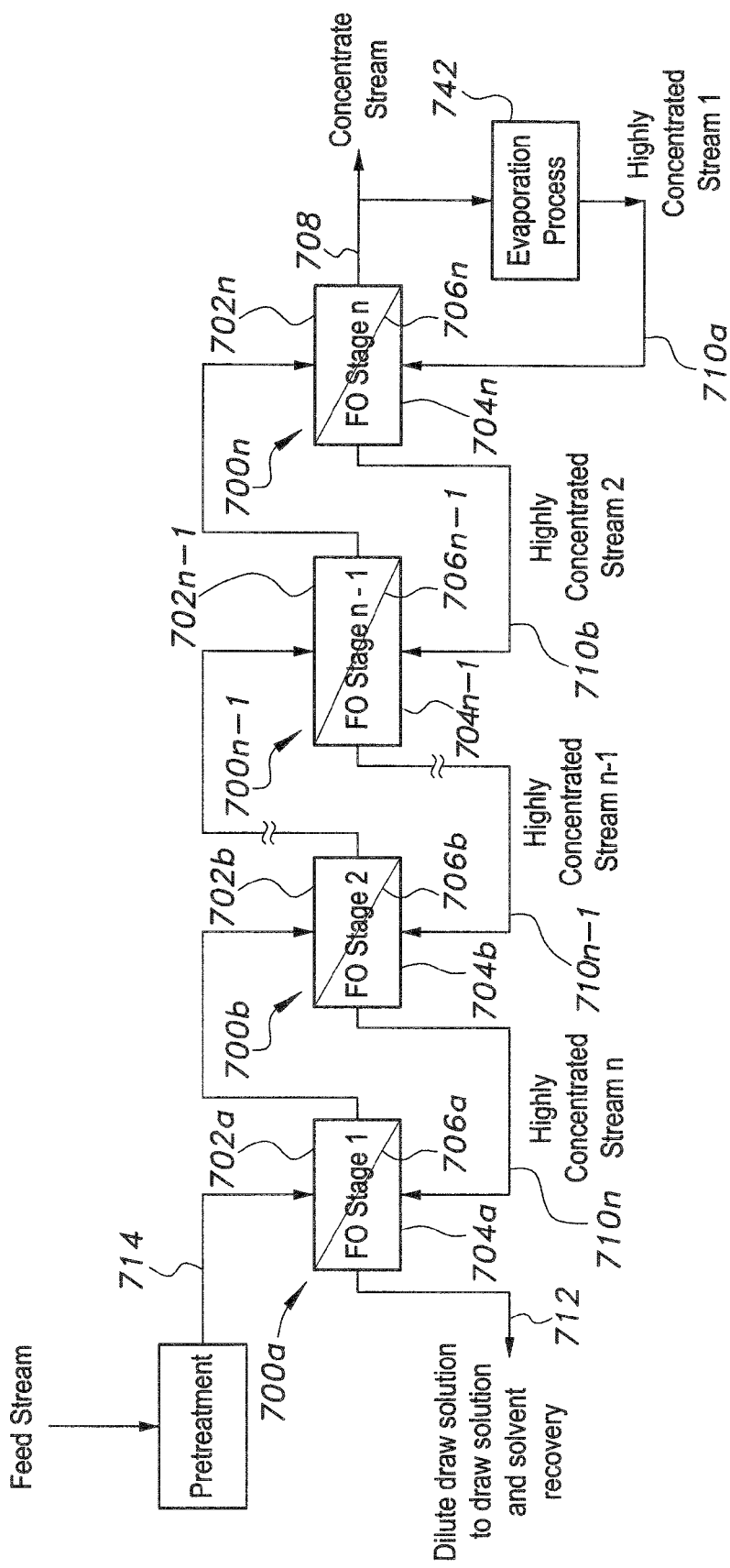
FIG. 7 is a schematic illustration of a seventh embodiment of a system and method of solvent recovery from a dilute solution according to the present invention, incorporating an evaporation process from the output stream of a forward osmosis system.

FIG. 7 of the drawings provides a schematic illustration of a seventh embodiment of the method of solvent recovery. It will be seen that most of the components of the seventh embodiment of FIG. 7 are essentially identical to corresponding components of the sixth embodiment of FIG. 6, but the components of the FIG. 7 embodiment are designated by reference characters beginning with the number "7," rather than with a "6" as in the case of the embodiment of FIG. 6. The method of operation of the system illustrated in FIG. 7 is generally the same as described above for the operating method of the embodiment of FIG. 6, i.e., using forward osmosis, but an evaporation process 742 is incorporated in the system. The draw solution 710a can be produced from the concentrate stream 708 by drawing a certain percentage, e.g., 1%-99%, of the concentrate stream 708 and further concentrating it by the evaporation process 742. This evaporation process 742 can be conducted in an evaporator, crystallizer, or using natural evaporation using air or hot air in a cooling tower, a chiller in a cooling system, an evaporation pond, a spray tower, or any other evaporation method that evaporates the solvent. This concentration method can be applied to the concentrated recycle streams from the last stage in all the processes described herein, including the RO processes.

Figure 8:
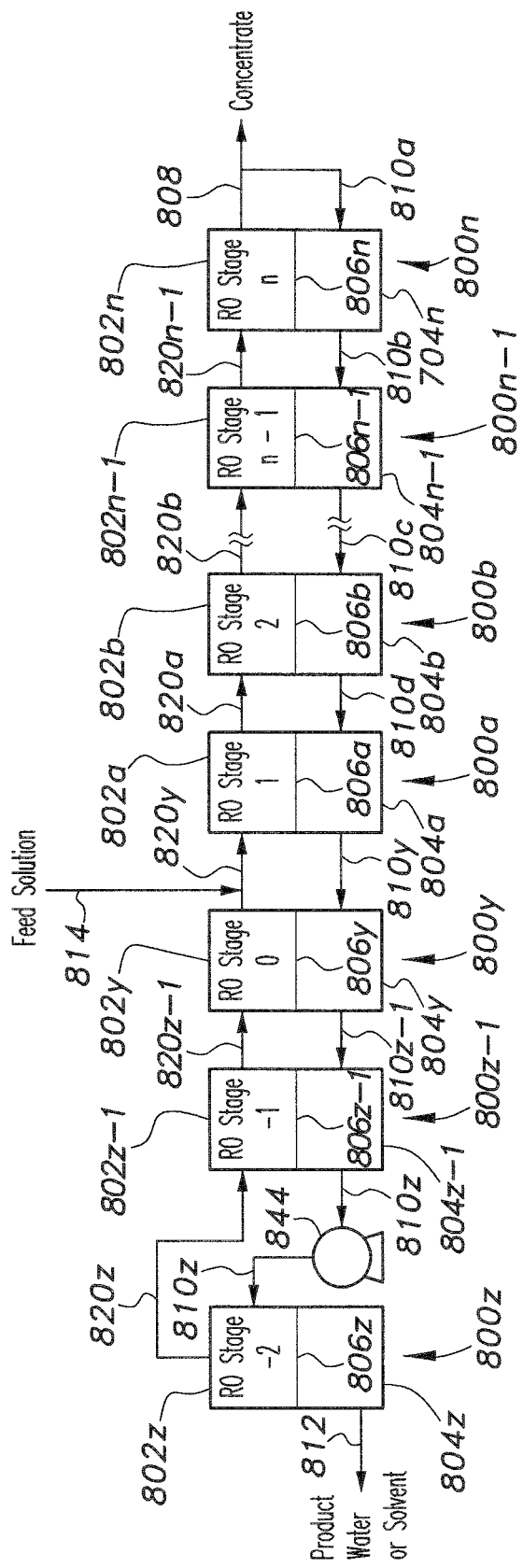
FIG. 8 is a schematic illustration of an eighth embodiment of a system and method of solvent recovery from a dilute solution according to the present invention, incorporating the introduction of a feed solution between two stages of a reverse osmosis system.

FIG. 8 of the drawings provides a schematic illustration of an eighth embodiment of the method of solvent recovery from a dilute solution. It will be seen that the components of the eighth embodiment of FIG. 8 are essentially identical to corresponding components of the first embodiment of FIG. 1, but the components of the FIG. 8 embodiment are designated by reference characters beginning with the number "8," rather than with a "1" as in the case of the embodiment of FIG. 1. The method of operation of the system illustrated in FIG. 8 is related to that described further above for the operating method of the first embodiment of FIG. 1, in that the concentrate side $802a$-$802n$-1 communicates with the concentrate side $802b$-$802n$ of the next successive reverse osmosis stage $800a$-$800n$ via concentrate lines $820a$-$820n$-1. However, it will be seen that in the embodiment of FIG. 8, a plurality of additional stages $800y$, $800z$-1, and $800z$ are provided before the $800a$ reverse osmosis stage. These stages $800y$-$800z$ are essentially identical to the stages $800a$-$800n$ described above, having concentrate sides $802y$-$802z$, permeate sides $804y$-$804z$, and membranes $806y$-$806z$ separating their respective concentrate and permeate sides.

It will be noted that the feed solution line 814 delivers solution to the concentrate line $820y$, with there being multiple stages $800y$-$800z$ (any practicable number may be provided) to the opposite side of the feed solution line 814 from the other reverse osmosis stages $800a$-$800n$. The stages $800y$-$800z$ communicate with one another generally in the same manner as the other stages $800a$-$800n$, with a series of concentrate lines $820z$-$820y$ extending between the concentrate sides $802z$-$802a$ of the respective stages $800z$-$800a$, and a series of recycle lines $810y$-$810z$-1 extending between the permeate sides $804a$-$804z$-1 of the respective stages $800a$-$800z$-1. The remaining recycle line $810z$ extends from the permeate side $804z$-1 of the reverse osmosis stage $800z$-1, to the concentrate side $802z$ of stage $800z$.

This embodiment utilizes reverse osmosis. As such, a pump 844 can be installed in the recycle line $810z$, between the permeate side $804z$-1 of reverse osmosis stage $800z$-1 and the concentrate side $802z$ of reverse osmosis stage $800z$. It will be seen that as the embodiment of FIG. 8 is a closed system excepting the feed solution input 814, the concentrate output 808, and the product solvent outflow 812, that the pump 842 can provide pressure for the operation of the entire system. The recycle stream $810a$ can be concentrated to a level higher than that of the concentrate output stream 808 by employing an evaporation or other concentration process as described further above for the embodiment of FIG. 7. By doing this, the stream on the permeate side of the process will have a higher concentration than that of the solution on the feed side, and the process becomes a forward osmosis (FO) process in which FO membranes can be used and the pressure differential in all stages can be reduced even further.

Figure 9:
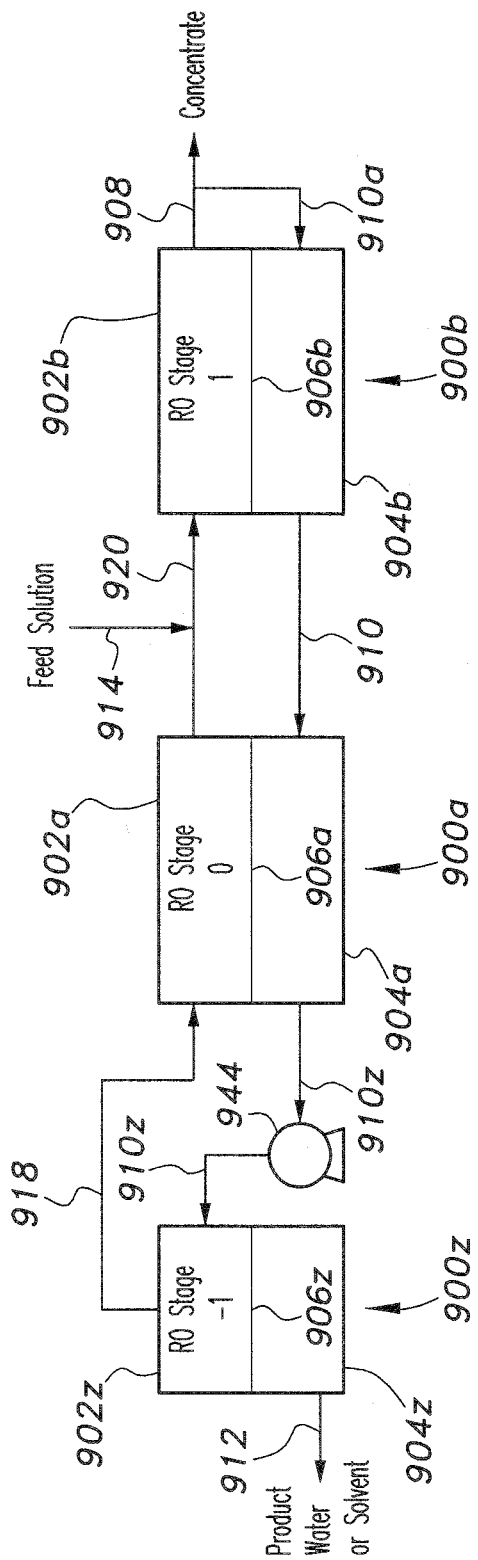
FIG. 9 is a schematic illustration of a ninth embodiment of a system and method of solvent recovery from a dilute solution according to the present invention, wherein a feed solution is introduced between two stages comprising a first stage and a final stage.

FIG. 9 of the drawings provides a schematic illustration of a ninth embodiment of the method of solvent recovery from a dilute solution. It will be seen that the components of the ninth embodiment of FIG. 9 resemble the corresponding components of the eighth embodiment of FIG. 8, but the components of the FIG. 9 embodiment are designated by reference characters beginning with the number "9," rather than with an "8" as in the case of the embodiment of FIG. 8. The method of operation of the system illustrated in FIG. 9 is related to that described above for the operating method of the eighth embodiment of FIG. 8, in that the concentrate side of each stage communicates with the concentrate side of the next successive reverse osmosis stage via a concentrate line.

However, it will be seen that in the embodiment of FIG. 9, only two reverse osmosis stages or units, respectively $900a$ and $900b$, are provided. This is because each of the stages $900a$ and $900b$ is significantly larger or longer than those of other embodiments, as can be seen by comparing the stages or units $900a$ and $900b$ of FIG. 9 with the smaller stages or units of other embodiments illustrated in other Figs. As such, osmosis membranes $906a$ and $906b$ with significantly larger surface areas (or alternatively, nanofilters or other suitable filtration means) between the concentrate sides $902a$, $902b$ and permeate sides $904a$, $904b$ of the respective stages $900a$ and $900b$ can be provided. Otherwise, the system or embodiment of FIG. 9 operates in essentially the same manner as that described above for the embodiment of FIG. 8, with the feed solution 914 communicating with the central concentrate line 920, with a concentrate line 918 connecting the concentrate side $902a$ of the first reverse osmosis stage $900a$ with the concentrate side $902b$ of the next reverse osmosis stage $900b$ and a recycle line 910 connecting the permeate side $904b$ of the final reverse osmosis stage $900b$ with the permeate side $904a$ of the first reverse osmosis stage $900a$.

A pump 944 is installed in the recycle line $910z$, between the permeate side $904a$ of reverse osmosis stage $900a$ and the concentrate side $902z$ of reverse osmosis stage $900z$. It will be seen that as the embodiment of FIG. 9 is a closed system excepting the feed solution input 914, the concentrate output 908, and the product solvent outflow 912, that the pump 944 can provide pressure for the operation of the entire system.

Figure 10:
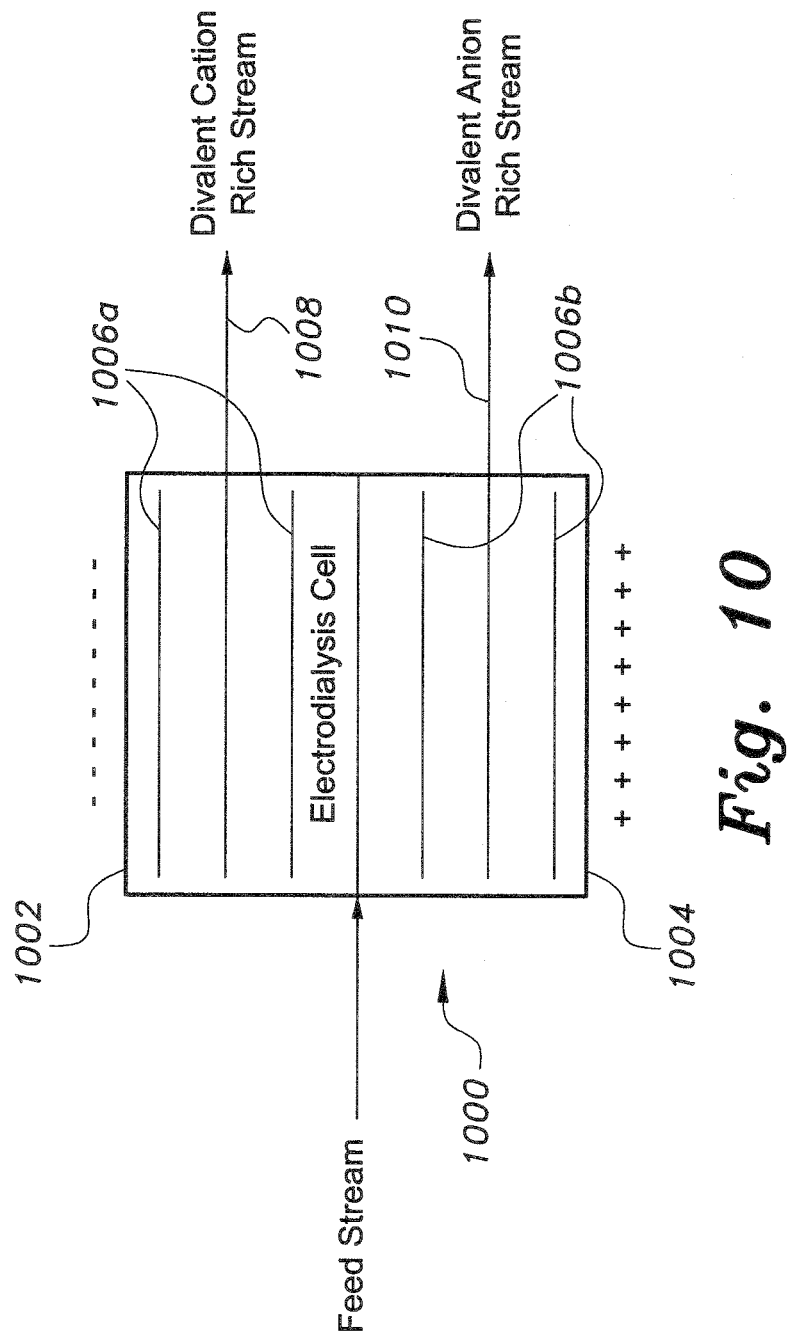
FIG. 10 is a schematic illustration of a pretreatment method for feed water for the system and method of solvent recovery from a dilute solution according to the present invention, using an electrodialysis cell in which divalent ion selective membranes are used.

FIG. 10 of the drawings provides a schematic illustration of a tenth embodiment of the method of solvent recovery from a dilute solution, comprising a pretreatment method for feed water using a special type of electrodialysis cell 1000 in which divalent ion selective membranes are used. Two types of divalent ion selective membranes are used. A first membrane 1006a is permeable only to divalent cations, e.g., $Ca^{++}$ and $Mg^{++}$, and a second membrane 1006b is permeable only to divalent anions, e.g., $SO4^{--}$ and $CO3^{--}$. The divalent cations will be concentrated near the anode side 1002 of the electrodialysis cell 1000, while the divalent anions will be concentrated near the cathode side of the cell 1000. As a result, a divalent cation rich stream 1008 and a divalent anion rich stream 1010 will be formed. The cation rich stream 1008 will be rich in calcium and magnesium, while the anion rich stream 1010 will be rich in sulfates and carbonates. The two streams 1008 and 1010 can be processed separately in any of the processes described herein and depicted in FIGS. 1 through 9. This pretreatment will reduce the possibility of scale formation because calcium chloride, magnesium chloride, and sodium sulfate are all highly soluble in water.

Figure 11:
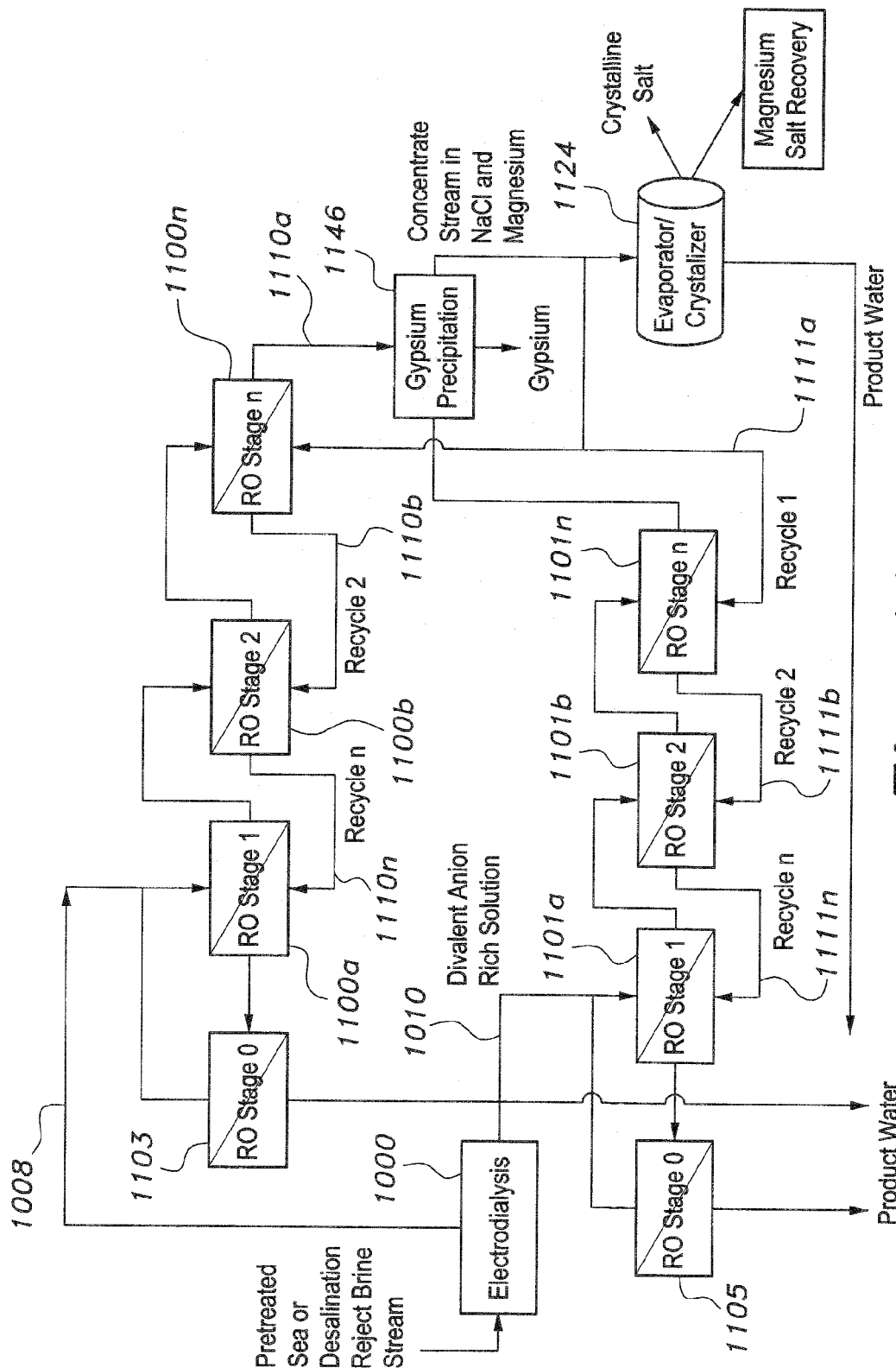
FIG. 11 is a schematic illustration of an eleventh embodiment of the method of solvent recovery from a dilute solution, wherein two parallel chains or series of reverse osmosis (RO) units are used.

FIG. 11 of the drawings provides a schematic illustration of an eleventh embodiment of the method of solvent recovery from a dilute solution. The method of solvent recovery embodiment of FIG. 11 incorporates two parallel chains or series of reverse osmosis (RO) units, with those units being similar to the RO units of other embodiments. The upper series of RO units 1100a through 1100n receive a divalent cation rich stream from the electrodialysis unit 1000 via a concentrate stream 1008, while the lower series of RO units 1101a through 1101n receive a divalent anion rich stream from the electrodialysis unit 1000 via a concentrate stream 1010. The RO units process the solute(s) therein as in various RO embodiments described further above, with solute flowing back from the final unit 1100n to the first unit 1100a through recycle streams or lines 1110a through 1110n, and solute flowing back from the final unit 1101n to the first unit 1101a through recycle streams or lines 1111a through 1111n. The first stage RO units 1100a and 1101a communicate respectively with RO zero stages 1103 and 1105, similarly to the system illustrated in FIG. 1 and described further above.

The output of the final RO stage 1100n is a divalent cation stream rich in sodium chloride and magnesium, as well as gypsum (calcium sulfate, CaSO4). This stream is processed through a gypsum precipitation unit 1146, with the remaining NaCl and Mg rich stream continuing to an evaporator/crystallizer device 1124, similar to the evaporator/crystallizer unit 224 of the second embodiment illustrated in FIG. 2 and described further above. Alternatively, a precipitation process incorporating lime (CaO) or Ca(OH)2 may be used to precipitate the magnesium hydroxide (MgOH) from solution. The NaCl and Mg are recovered from the evaporator/crystallizer unit 1124 as sodium and magnesium crystalline salts, with water being returned to join with the water output from the RO zero stages 1103 and 1105.

It is to be understood that the present invention is not limited to the embodiments described above, but encompasses any and all embodiments within the scope of the following claims.

I claim:

1. A method of solvent recovery from a dilute solution, comprising the following steps:
    (a) performing a first phase of solvent recovery including providing a plurality of first phase reverse osmosis units, the first phase reverse osmosis units arranged in series with one another from a first reverse osmosis unit to a last reverse osmosis unit, each of the first phase reverse osmosis units having a concentrate side, a permeate side, and a reverse osmosis membrane separating the concentrate side from the permeate side, the concentrate side of each of the first phase reverse osmosis units communicating with the concentrate side of the next reverse osmosis unit in succession, the permeate side of each of the first phase reverse osmosis units communicating with the permeate side of the preceding reverse osmosis unit in succession;
    (b) performing a final phase solvent recovery including providing at least one final phase reverse osmosis unit, the final phase reverse osmosis unit having a concentrate side, a permeate side, and a reverse osmosis membrane separating the concentrate side from the permeate side, the permeate side of the first reverse osmosis unit of the first phase reverse osmosis units communicating with the concentrate side of the final phase reverse osmosis unit;
    (c) providing at least one liquid pump, the at least one liquid pump disposed between and communicating with the permeate side of the first reverse osmosis unit of the first phase reverse osmosis units and the concentrate side of the final phase reverse osmosis unit; wherein
    the first phase solvent recovery includes supplying a feed stream of solvent including solute to the concentrate side of the respective first phase reverse osmosis units, forcing solvent from the concentrate side into the permeate side of the reverse osmosis units by reverse osmosis, transferring at least a portion of the concentrate in the concentrate side of the last reverse osmosis unit into the permeate side of the last reverse osmosis unit to form a mixed permeate, and successively receiving a mixed permeate in the permeate side of the reverse osmosis units preceding the last reverse osmosis unit;
    the final phase reverse osmosis includes receiving a feed stream of mixed permeate in the concentrate side of the final phase reverse osmosis unit, forcing solvent from the concentrate side into the permeate side of the final phase reverse osmosis unit, and releasing the solvent from the permeate side of the final phase reverse osmosis unit to provide solvent;
    (d) providing a nanofiltration device or an electrodialysis device communicating with at least the concentrate side of the first reverse osmosis unit of the first phase reverse osmosis units;
    (e) providing a metals and solids recovery device communicating with the nanofiltration device or the electrodialysis device;
    (f) providing a solvent recovery device communicating with the metals and solids recovery device; and
    (g) processing liquid through the nanofiltration device or the electrodialysis device, the metals and solids recovery device, and the solvent recovery device,
    wherein the nanofiltration device, the electrodialysis device, the metals and solids recovery device, and the solvent recovery device are disposed in series.

2. The method of solvent recovery from a dilute solution according to claim 1, wherein the reverse osmosis membrane in each of the first phase reverse osmosis units is a low rejection membrane and the reverse osmosis membrane of the final phase reverse osmosis unit is a high rejection membrane.

3. The method of solvent recovery from a dilute solution according to claim 1, further including the steps of:
    (a) providing an evaporator and/or crystallizer device communicating with the concentrate side of the last reverse osmosis unit of the first phase reverse osmosis units; and
    (b) passing at least a portion of concentrate from the concentrate side of the last reverse osmosis unit to the evaporator and/or crystallizer device.

4. The method of solvent recovery from a dilute solution according to claim 1, wherein the electrodialysis device includes at least one divalent cation selective membrane and at least one divalent anion selective membrane, the at least one cation selective membrane and the at least one anion selective membrane respectively separating the feed streams into a divalent cation rich stream and a divalent anion rich stream.

5. The method of solvent recovery from a dilute solution according to claim 1, further including the step of providing a magnesium hydroxide recovery device communicating with the concentrate side of the last reverse osmosis unit of the first phase reverse osmosis units.

* * * * *